UNITED STATES PATENT OFFICE.

FRED. A. NICKERSON, OF SPRINGFIELD, MASSACHUSETTS, ASSIGNOR TO DICKINSON HARD RUBBER COMPANY, OF SAME PLACE.

PROCESS OF ORNAMENTING THE SURFACES OF HARD RUBBER WITH COLORS.

SPECIFICATION forming part of Letters Patent No. 235,644, dated December 21, 1880.

Application filed May 19, 1880. (No specimens.)

*To all whom it may concern:*

Be it known that I, FRED. AUGUSTUS NICKERSON, a citizen of the United States, residing at Springfield, in the county of Hampden and State of Massachusetts, have invented certain new and useful Improvements in Processes for Ornamenting the Surface of Hard Rubber with Colors; and I do hereby declare that the following is a full, clear, and exact description of the invention, which will enable others skilled in the art to which it appertains to make and use the same.

My invention relates to the ornamentation of the surface of hard rubber by means of colors applied thereupon; and the object of my invention is to provide a suitable color-mixture and color-protector which is adapted to be applied upon the surface of hard rubber, which is, by certain subsequent manipulation of the rubber upon which said color-mixture has been applied, caused to be so amalgamated with the rubber surface as to form substantially a part of the same, in contradistinction to color ornamentation which is simply laid upon and left to project, when dry, above the surface.

Such ornamentation of hard-rubber surfaces by colors as has heretofore been practiced has been operated by laying on such colors, mixed with oils and well-known driers, by the aid of a brush or equivalent device; but as hard rubber is of such a nature as to prevent it from absorbing such colors or an ordinary mixture thereof similar to that above described, ornamental colors so applied to hard rubber give to the article so ornamented a cheap and unartistic appearance, and the colors so applied cannot have that degree of adhesion to the rubber surface which is essential to durability; and, furthermore, by such a method of ornamenting, it cannot be made to appear that the colors and the rubber are inseparable, and the very desirable appearance of integrality of colors and rubber is entirely lacking.

I have discovered that a mixture of pigment colors with an ordinarily thick solution of shellac dissolved in alcohol, forming a species of paint which can be easily spread by using a brush applied to the surface of hard rubber, produces new and beautiful effects after such rubber so ornamented has been pressed between warm or hot metallic blocks.

In carrying out my invention I take pieces of hard rubber having an ordinarily smooth surface, and using color-mixtures such as I have described above and as hereinafter described, I form in any convenient manner ornamental figures thereon of regular or irregular forms, and after such figures have become dried I subject the rubber piece so ornamented to quite a strong pressure for a moment between smooth heated metallic plates or blocks. The effect of such heat and pressure upon the rubber and the colors, together with the shellac with which they are mixed, is to cause the said color-elements to become so amalgamated with the surface of the rubber as to form with it a highly-finished surface, causing the colors to assume a mosaic appearance thereon, and to look as though they were part and portion of the rubber body itself. Colors so applied are so firmly affixed to the rubber as to be removable only with great difficulty, and hence the ornamentation is very durable.

An ornamentation much resembling that above described may be produced by forming the said figures on the rubber with oil-colors, over which, after they have become dry, a coat of shellac-varnish is laid, and afterward pressing the rubber, as above described.

Having fully described my invention, what I claim and desire to secure by Letters Patent is—

1. The process of ornamenting the surface of hard rubber with colors, which consists in forming thereupon, with colors mixed with a solution of gum-shellac and alcohol, ornamental figures, and subsequently in subjecting hard rubber so ornamented to pressure between heated plates or blocks, substantially as and for the purpose set forth.

2. The process of ornamenting the surface of hard rubber with colors, which consists in forming thereupon with oil-colors ornamental figures covered, when dry, with shellac varnish, and subsequently in subjecting hard rubber so ornamented to pressure between heated plates or blocks, substantially as and for the purpose set forth.

FRED. A. NICKERSON.

In presence of—
WM. H. CHAPIN,
J. C. STODDARD.